Patented Feb. 18, 1941

2,232,515

UNITED STATES PATENT OFFICE 2,232,515

SYNTHETIC RESIN PREPARED BY INTER-POLYMERIZING A MIXTURE OF A METH-ACRYLIC ACID ESTER AND A 1,3-BUTADI-ENE

Harold Wilfred Arnold and George Lowrance Dorough, Wilmington, Del., assignors to E. I. du Pont de Nemours & Company, Wilmington, Del., a corporation of Delaware No Drawing. Application July 4, 1939, Serial No. 282,814

11 Claims. (Cl. 260—84)

This invention relates to new resinous compositions of matter and to processes of their preparation. More particularly, it relates to soluble and moldable resins prepared by interpolymerizing a mixture of a methacrylic acid ester of a short chain aliphatic alcohol and a 1,3-butadiene, said mixture containing less than 20 per cent butadiene.

Many synthetic resins have been made by the polymerization and interpolymerization of polymerizable materials. The prior art in this field is too voluminous to discuss in detail. More specifically, it is known in the prior art to make interpolymers of vinyl compounds and butadienyl compounds. For example, British Patent No. 456,442 discloses the interpolymerization of such materials as acrylic acid and 1,3-butadiene. The resins made according to the process of British Patent 456,442 have the disadvantage that they are insoluble in organic solvents and, hence, cannot be used as film-forming materials. Butadiene has been interpolymerized with methyl methacrylate as is shown, for example, by British Patent 485,941. As shown in this patent, however, the polymeric materials are used in such proportions that the resulting products are synthetic rubbers. They likewise are insoluble in organic solvents.

It is an object of this invention to prepare synthetic resins which are soluble in common organic solvents and are capable of forming tough pliable films. Another object of the invention is to provide synthetic resins which are capable of being molded without the addition of plasticizers and without any plasticizing treatment of any kind. A further object is to provide synthetic resins which are amenable to mechanical working such as punching and drilling. A still further object is to develop a rapid and efficient method for making such resinous products. Other objects will appear hereinafter.

The objects of this invention are accomplished by interpolymerizing a methacrylic acid ester of a short-chain aliphatic alcohol with a 1,3-butadiene, the amount of the latter material being less than 20 per cent of the total polymerizable material, said polymerization being accomplished by methods hereinafter set forth.

In order that the present invention may be fully understood, the following specific examples are set forth. Such examples are merely by way of illustration and the invention is not limited thereto, but suitable variations may be made as will become more apparent hereinafter. The term "parts" whenever hereinafter used signifies "parts by weight".

EXAMPLE I

*Methyl methacrylate and butadiene (90/10) emulsion interpolymer*

Sixty-seven and one-half parts of methyl methacrylate, 7.5 parts of butadiene, 1.5 parts of 30 per cent hydrogen peroxide solution, 3 parts of the sodium salt of the sulfate ester of oleyl acetate and 170 parts of water were introduced into a vessel of such a size that a vapor space of one-third remained. The vessel was sealed, agitated well to emulsify its contents, and heated with occasional agitation for 96 hours at 45° C. The vessel was opened, its contents were removed, diluted with an equal volume of water, warmed to 60° C. and treated with 10 parts of a 10 per cent solution of aluminum sulfate to coagulate the emulsion. The white solid was filtered off, washed well with water, and dried in a vacuum oven. The yield was 99 per cent of the total weight of butadiene and methyl methacrylate used.

The interpolymer was soluble in the common organic solvents such as toluene, acetone, dioxane, ethylene chloride, and butyl acetate, but not in aliphatic hydrocarbons. When solutions of the interpolymer were flowed on glass plates films were obtained upon evaporation of the solvent. These interpolymer films were transparent, flexible and strong. The interpolymer could be readily molded under heat and pressure to give molded products, which were tough, flexible, and capable of being mechanically worked. The softening temperature was about 65° C. as measured by slowly heating a molded chip one-eighth inch in thickness in an oil bath to the temperature at which it could be bent between one's fingers. By colloiding the interpolymer with a mixture of methyl acetate and methanol, milling on rolls, forming a cake, heating the latter under pressure, and then sheeting the cake, transparent sheets of the interpolymer could be obtained in any thickness desired from 0.005 inch to 0.5 inch or thicker.

EXAMPLE II

*Methyl methacrylate and butadiene (84/16) emulsion interpolymer*

Sixty-three parts of methyl methacrylate, 12 parts of butadiene, 1.5 parts of 30 per cent hydrogen peroxide solution, 3 parts of the sodium salt of the sulfate ester of oleyl acetate and 170 parts of water were treated as in the previous example The yield was 95 per cent of the total weight of butadiene and methyl methacrylate used. The interpolymer was soluble in toluene, acetone, dioxane, butyl acetate, and ethylene chloride, but insoluble in aliphatic hydrocarbons. Films of the interpolymer were clear and strong, but softer and more pliable than those of Example I. The interpolymer could be readily molded under heat and pressure to give molded products which were tough, strong and flexible but softer than those of Example I, the softening temperature by the method previously described being about 53° C.

EXAMPLE III

*Methyl methacrylate and butadiene (90/10) emulsion interpolymer*

Sixty-seven and five-tenths parts of methyl methacrylate, 13.4 parts of crude butadiene containing 56 per cent of butadiene and 44 per cent of butylenes, 1.5 parts of 30 per cent hydrogen peroxide solution, 170 parts of water, and 3 parts of the sodium salt of the sulfate ester of oleyl actate were treated as in Example I. The properties of the interpolymer were the same as those of Example I notwithstanding that in the present example an equivalent amount of butadiene of 56 per cent purity was employed.

EXAMPLE IV

*Methyl methacrylate and butadiene (84/16) solution interpolymer*

Sixty-three parts of methyl methacrylate, 12 parts of butadiene, 15 parts of carbon tetrachloride, 20 parts of dioxane and 0.37 part of benzoyl peroxide were heated in a glass vessel at 65° C. for 72 hours. The mass was precipitated with a large volume of water, steam distilled to remove solvent, washed well with water and dried. The yield was 91 per cent of the initial weight of methyl methacrylate and butadiene employed. The interpolymer was soluble in the solvents of Example I and readily molded under heat and pressure to give molded products that were flexible and deformable at room temperature.

EXAMPLE V

*Butyl methacrylate and butadiene (92/8) emulsion interpolymer*

Sixty-nine parts of n-butyl methacrylate, 6 parts of butadiene, 1.5 parts of 30 per cent hydrogen peroxide solution, 3 parts of the sodium salt of the sulfate ester of oleyl acetate and 170 parts of water were treated as in Example I. The interpolymer was soluble in the solvents discussed in the preceding examples. Films of the interpolymers were clear, very pliable, soft and slightly tacky. The interpolymer could be readily molded under heat and pressure to give tough, flexible, but rather soft moldings which were deformable at room temperature.

EXAMPLE VI

*Methyl methacrylate, butyl methacrylate, and butadiene (64.5/21.5/14) emulsion interpolymer*

Forty-eight and three-tenths parts of methyl methacrylate, 16.1 parts of n-butyl methacrylate, 10.5 parts of butadiene, 1.5 parts of 30 per cent hydrogen peroxide solution, 3 parts of the sodium salt of the sulfate ester of oleyl acetate and 170 parts of water were treated as in Example I. The yield was quantitative. The interpolymer was soluble in the solvents described in Example I and films of the interpolymer were clear, non-tacky, very pliable and flexible, but rather soft. The interpolymer could be molded readily under heat and pressure to give clear, tough, flexible moldings which could be deformed at room temperature.

EXAMPLE VII

*Ethyl methacrylate and butadiene (88/12) emulsion interpolymer*

Sixty-six parts of ethyl methacrylate, 9 parts of butadiene, 1.5 parts of 30 per cent aqueous hydrogen peroxide, 6 parts of an aqueous solution containing approximately 3 parts of the sodium salt of the sulfate ester of oleyl acetate and 170 parts of water were treated as in Example I except that the interpolymer was precipitated at room temperature instead of at 60° C., and that the reaction mixture was heated for approximately 120 hours instead of 96 hours. A 37.5 per cent yield of a gummy, slightly yellow interpolymer was obtained. This interpolymer was soluble in toluene, butyl acetate, acetone, dioxan, and ethylene dichloride. Films of the interpolymer were clear, flexible, and soft.

EXAMPLE VIII

*Propyl methacrylate and butadiene (88/12) emulsion interpolymer*

Example VII was repeated using n-propyl methacrylate. A slightly yellow, somewhat gummy but not sticky interpolymer soluble in toluene, butyl acetate, acetone, dioxan, and ethylene dichloride was obtained. The yield was 51.5 per cent.

EXAMPLE IX

*Methyl methacrylate and 2-methyl-1,3-butadiene (90/10) emulsion interpolymer*

Ninety parts of methyl methacrylate, 10 parts of 2-methyl-1,3-butadiene, 1 part of 30 per cent hydrogen peroxide solution, 144 parts of water, and 3 parts of the sodium salt of the sulfate ester of oleyl acetate were heated in a closed container at 42° C. for 168 hours. The emulsion was coagulated as in Example I. The yield amounted to 88 per cent of the amount of 2-methyl-1,3-butadiene and methyl methacrylate initially used. The interpolymer was soluble in the solvents of Example I and molded readily under heat and pressure to give clear, tough molded products, similar in properties to the corresponding interpolymers from butadiene and methyl methacrylate.

EXAMPLE X

*Ethyl methacrylate and butadiene (88/12) emulsion interpolymer*

Example VII was repeated except that the polymerization was carried out at 65° C. instead of 45° C. The precipitated interpolymer was substantially colorless and not gummy like the product of Example VII. A yield of 77 per cent was obtained.

EXAMPLE XI

*Propyl methacrylate and butadiene (88/12) emulsion interpolymer*

Example VIII was repeated except that the polymerization was effected at 65° C. instead of 45° C. A substantially colorless, somewhat gummy interpolymer was obtained which was soluble in toluene, butyl acetate, acetone, dioxan, and ethylene dichloride with somewhat more difficulty than was the interpolymer produced at 45° C. (Example VIII.) A 79 per cent yield was obtained.

In the preceding examples, the interpolymerization of butadiene with methacrylic esters by the emulsion procedure and by the solution method has been described. We have also discovered that butadiene-methacrylic ester mixtures can be caused to yield polymerization products in granular or globular form, providing the polymerization is effected in the presence of water as a medium and with proper agitation whereby agglomeration of the individual droplets on the one hand and their extended dispersion on the other are prevented. In the following examples, XII and XIII, the use of a granulation technic is illustrated by which the interpolymers can be prepared in the form of small granules or pellets instead of in the finely divided state resulting from the emulsion method. For certain purposes the granulation procedure offers advantages over the emulsion process as for example in requiring less dispersing agent, and, hence, less subsequent washing to remove it, and in furnishing the granular product as an easily filterable suspension requiring no coagulation. Furthermore, because of its compact form and its high bulk density, the granular product is free settling, easy to wash, and, in particular, well adapted for handling and packing into containers, including molding equipment.

EXAMPLE XII

*Methyl methacrylate and butadiene (88/12) granular interpolymer*

Fifty-two and eight-tenths parts of methyl methacrylate, 7.2 parts of butadiene, 0.36 part of benzoyl peroxide, 150 parts of water, and 0.8 part of an interpolymer prepared from 75 per cent of methacrylic acid and 25 per cent of methyl methacrylate which has been neutralized with sodium hydroxide to a pH of 7 to 8, were placed in a stainless steel container and agitated vigorously for 7 hours at 90° C. Agitation was continued while the reaction vessel was cooled to room temperature. Upon opening the reaction vessel, the interpolymer was obtained in the form of small granules resembling sea sand, in a yield corresponding to 91 per cent of the theoretical. The interpolymer was soluble in acetone, toluene, ethylene dichloride, dioxane, and butyl acetate. Films of the interpolymer were clear, colorless, tough, and strong. The interpolymer molded readily by ordinary or by injection molding methods to give substantially colorless, tough, horny products softening at 50 to 55° C.

EXAMPLE XIII

*Methyl methacrylate, butyl methacrylate and butadiene (60/30/10) granular interpolymer*

Forty-eight parts of methyl methacrylate, 24 parts of n-butyl methacrylate, 8 parts of butadiene, 0.4 part of benzoyl peroxide, 160 parts of water, and 0.4 part of an interpolymer prepared from 75 per cent of methacrylic acid and 25 per cent of methyl methacrylate, which has been neutralized with sodium hydroxide to a pH of 7 to 8, were heated in a stainless steel container for 6 hours at 90° C. while being vigorously agitated. The subsequent procedure was similar to that of Example X, the product being obtained in the form of fine granules in a yield of 90 per cent. The interpolymer was soluble as above, gave colorless, flexible, and strong films, and molded readily under heat and pressure to give molded products of excellent toughness and flexibility, which by moderate pressure could be deformed at room temperature.

As indicated in the previous examples, the ratio of methacrylic acid ester to butadiene has an important influence on the properties of polymerization products. In general, as the proportion of butadiene increases, the toughness, flexibility, and also the softness increase and the products become more and more rubber like in nature. Thus, products containing from 4 to less than 20 per cent of butadiene are soluble in common organic solvents and are substantially resinous in nature, while those containing from 20 to 30 per cent butadiene are insoluble in common organic solvents and are increasingly rubber like, while interpolymers with more than 30 per cent of butadiene are synthetic rubbers. This is illustrated briefly in Table I as follows:

*Table I*

| Percent butadiene | Percent methyl methacrylate | Properties |
|---|---|---|
| 4 | 96 | Soluble resin, more flexible than polymeric methyl methacrylate. |
| 6 | 94 | More flexible than preceding resin. |
| 8 | 92 | Fairly tough, soluble resin. |
| 10 | 90 | Do. |
| 12 | 88 | Tough soluble resin. |
| 16 | 84 | Somewhat softer, more pliable soluble resin. |
| 20 | 80 | Insoluble, rather soft, pliable material. |
| 30 | 70 | Insoluble, soft, rubber-like inter polymer. |
| 40 | 60 | Insoluble, synthetic rubber. |
| 50 | 50 | Insoluble, vulcanizable synthetic rubber. |

The present invention is concerned with interpolymers containing less than 20 per cent of butadiene, i. e., with polymeric materials which are soluble in organic solvents. Within this group, interpolymers containing from 8 to 12 per cent butadiene may be cast into tough, flexible films from solution. Sheets of moderate thickness, though rigid, can be bent considerably without breaking if pressure is applied slowly. When the amount of butadiene is increased to 16 per cent, the toughness and flexibility increase accompanied by a lowering in the softening temperatures. When the amount of butadiene is decreased to 4 per cent, the interpolymers are less flexible than the 8% product but more flexible than polymeric methyl methacrylate. Hence, the range of properties, such as toughness, flexibility, and softening point obtainable by varying the butadiene content from 4 to 16 per cent is considerable.

When butyl methacrylate is used in place of methyl methacrylate, the interpolymers of butadiene are much softer. Thus, moldings from interpolymers containing 96 per cent of butyl methacrylate and 4 per cent of butadiene are only moderately rigid at room temperature, while those from interpolymers containing 8, 12, and 16 per cent of butadiene and the remainder butyl methacrylate lack rigidity and are easily deformed at room temperature. Interpolymers wherein ethyl methacrylate and propyl methacrylate are used have properties intermediate between those of methyl and butyl methacrylates.

Interpolymers may also contain two or more methacrylic acid esters. For example, when mixtures containing both methyl methacrylate and butyl methacrylate are interpolymerized with butadiene, the properties of interpolymers such as flexibility, toughness, and softness are influenced by the proportions of all three compounds. These differences are illustrated in the following table which includes some additional polymers prepared by the procedure of Example I.

Table II

| Percent butadiene | Percent butyl methacrylate | Percent methyl methacrylate | Organic solubility | Properties of molded articles at room temp. |
|---|---|---|---|---|
| 4 | 96 |  | Soluble | Flexible, semirigid, tough. |
| 8 | 92 |  | do | Softer than preceding, readily deformable. |
| 12 | 88 |  | do | Soft and somewhat tacky. |
| 16 | 84 |  | do | Softer than preceding. |
| 10 | 45 | 45 | do | Fairly rigid, non-tacky. |
| 10 | 18 | 72 | do | Tough, rigid. |
| 10 | 36 | 54 | do | Do. |
| 10 | 54 | 36 | do | Less rigid than preceding. |
| 14 | 43 | 43 | do | Tough, rather soft, non-tacky. |
| 14 | 28.66 | 57.34 | do | Easily deformable. |
| 14 | 21.5 | 64.5 | do | Tough, non-tacky. |

The methacrylic acid esters which fall within the scope of the present invention are those obtainable by esterifying methacrylic acid with short chain aliphatic alcohols and may be expressed by the following formula:

$$CH_2=C-COOR$$
$$\phantom{CH_2=C-}|$$
$$\phantom{CH_2=C-}CH_3$$

wherein R is a low molecular weight alkyl radical. By "low molecular weight alkyl radical" is meant an alkyl radical having less than 8 carbon atoms. Preferably, the alkyl radical has not more than 4 carbon atoms. Methyl methacrylate is especially preferred. Butyl methacrylate, isopropyl methacrylate, isobutyl methacrylate and mixtures of methyl and butyl methacrylates have also been found to be quite desirable.

Butadiene of several different grades can be employed including that prepared by the catalytic dehydration of butylene glycol, or butadiene from the dehydrohalogenation of dichlorobutanes, or that which is isolated by the fractionation of cracked gases in the petroleum industry. Impure grades of butadiene such as those containing as little as 50 per cent of butadiene mixed with butylene can be used if allowance is made for the foreign material in calculating the methacrylic acid ester-butadiene ratios. While 1,3-butadiene is the most satisfactory and the most readily available compound of the butadiene group, 2-methyl-1,3-butadiene and 2,3-dimethyl-1,3-butadiene likewise have an effect similar to that of butadiene and are within the scope of the invention. Moreover, mixtures of two or more of these butadienes may be used. While any amount of butadiene from about 4 per cent to less than 20 per cent is within the scope of the invention, from 8 to 16 per cent is considered preferable.

When the synthetic resins of the present invention are prepared by emulsion polymerization, any substances may be used as emulsifying agents, which, when dispersed in water, are capable of giving permanent dispersion in the water of the mixture of butadiene and methacrylic acid ester. The most suitable of emulsifying agents are those which give stable dispersions without promoting hydrolysis of the ester to an undesirable extent.

Examples of such agents in addition to those given in Example I are:

Sodium salts of sulfated long-chain alcohols such as the sodium salt of the sulfate ester of the alcohols obtained by the hydrogenation of coconut oil or sperm oil
Sodium salts of lignin sulfonic acids
Ivory soap
Cetyl p-dimethylaminobenzoate methosulfate
Cetyl trimethyl ammonium bromide
$$C_{16}H_{33}(CH_3)_3N-Br$$
Cetyl methyl piperidinium methyl sulfate
$$C_{16}H_{33}(CH_3)(C_5H_{10}=)N-O-SO_2-O-CH_3$$
Oleoamidoethyl diethylamine acetate
$$C_{17}H_{33}CONHC_2H_4NH(C_2H_5)_2-OCOCH_3$$
N—stearyl betaine

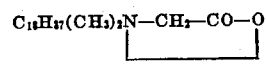

C—cetyl betaine

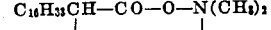

Parastearamidophenyl trimethylamine methyl sulfate
$$C_{17}H_{35}CONHC_6H_4N(CH_3)_3-O-SO_2-O-CH_3$$

A 2 or 3 per cent solution of an emulsifying agent in water is usually suitable for forming a good disperson, but a stronger or weaker solution, for example, .02 per cent to 10 per cent may also be used.

Where the interpolymerization is carried out by a method which gives a granular product, agents which have the property of being relatively poor dispersing agents and thereby forming nuclei for the formation of granules of the interpolymer may be used. The granulation process may be defined as a method for preparing the above interpolymers in granular form which comprises dispersing, and polymerizing while thus dispersed, the polymerizable monomer mixture in water by means of a dispersing agent and stirring or shaking, the concentration of the dispersing agent being not substantially greater than an amount sufficient to maintain the monomers in the dispersed phase while stirring is continued, and, to prevent coalescence of the dispersed particles during polymerization, the quantity of dispersing agent also being insufficient to give a permanently dispersed product. It will thus be appreciated that efficient agitation is essential from the inception of the actual polymerization until the product is substantially completely polymerized, since separation in two liquid phases takes place if the agitation is interrupted before or shortly after the inception of polymerization. In addition to the granulation agents mentioned in Examples XII and XIII, the following are given by way of illustration:

Sodium cellulose glycolate
Sodium starch glycolate
Methyl starch
Soluble starch
Gums of various kinds such as gum tragacanth, and acacia
Polymethacrylamide
Partially hydrolyzed polyvinyl acetate
Partially neutralized polymethacrylic acid
Glue
Gelatin
Agar agar
Sodium alginate For interpolmerization by the granulation method, a 0.1 per cent to 1 per cent solution of a granulating agent is usually suitable. Those skilled in the art will appreciate the fact that the enumerated colloids do not all have equal dispersing powers, e. g. gum tragacanth is less effective than sodium starch glycolate. Accordingly when changing from one colloid to another a greater or lesser amount thereof must be employed providing the effectiveness of the substituting colloid is less or greater than that of the colloid first employed. The determining factor is of course that the percentage of colloid be so adjusted that the preferred granular form of polymer is produced.

As catalysts for polymerization, hydrogen peroxide and benzoyl peroxide are particularly well suited although other catalysts capable of delivering active oxygen to the systems may be employed, such as the peroxides of sodium or barium. An amount of catalyst corresponding to 0.4 to 0.8 per cent of the polymerizable material in the mixture is very satisfactory though the amount can be varied in either direction and, depending upon the polymerization rates of the unsaturated ester, smaller or larger amounts may be employed.

The ratio of the dispersed phase (butadiene and methyl methacrylate) to water may be widely varied. Convenient and satisfactory amounts of water are in the range of 100 per cent to about 300 per cent of the dispersed phase. For the solution method either concentrated or dilute solutions of the methacrylic ester and butadiene in organic solvents may be employed and instead of the carbon tetrachloride and dioxane illustrated in Example IV, other solvents such as ethylene dichloride, acetone, butyl acetate, benzene and toluene may be employed. If desired, the polymerization may be made in bulk, that is, without solvents, the butadiene merely being dissolved in the calculated amount of methyl methacrylate.

The polymerization may be carried out conveniently at 45° C., excellent interpolymers being obtainable at this temperature after three to four days of heating. However, the temperature can be increased to about 90 to 100° C. or above, and the time of polymerization thereby greatly reduced. Thus, in Example XII, the polymerization time was reduced to seven hours by using a temperature of 90° according to the granulation method. However, temperatures either higher or lower than those indicated can be employed. It is, of course, obvious that the pressures developed by polymerization at 45° C. are much less than those developed at 100° C., and, hence, at the higher temperatures, stronger pressure equipment is needed than for polymerization at 45° C. The choice of polymerization temperature as well as polymerization method (such as emulsion versus granulation) will thus depend upon the type of equipment available. For polymerization by emulsion at 45° C., maximum pressures developed approximate 25 pounds per square inch and, thus, equipment capable of standing 75 to 100 pounds pressure is suitable whereas for granulation polymerization at 100° C., the equipment must be capable of standing higher pressures. When the emulsion procedure is used, effective initial agitation is required and thereafter only occasional agitation to maintain the emulsion, whereas the granulation method requires highly efficient agitation during the entire polymerization cycle. No agitation is required when the polymerization is carried out in solution in an inert solvent, or when the butadiene-methacrylic ester mixture is polymerized in the absence of a solvent.

The polymer emulsions or dispersions may be coagulated by any of the known methods applicable to dispersions made with the particular dispersing agent employed. In most cases the emulsions may be coagulated as in Example I by means of 10 per cent aluminum sulfate solution, added slowly and with stirring. Sodium chloride or other salt solutions, free acids such as dilute hydrochloric acid or acetic acid, or, in general, solutions of electrolytes may be employed. Alternatively, the emulsions may in some cases be broken by heating or by freezing, thereby avoiding the addition of foreign materials such as the electrolytes previously mentioned. Another method occasionally employed is to add an excess of an alcohol such as ethyl or butyl alcohol to the emulsion. Ordinarily a coagulating agent is not required when the granulation procedure is used, but should a small amount of emulsion be obtained along with the granular product, the emulsion can be broken and the coagulated product obtained by any one of the procedures just described. No coagulating agent is needed when polymerization of the butadiene-methacrylate ester mixture is conducted in a solvent or in the undiluted form.

In some instances in which films or molded products of the butadiene-methyl methacrylate interpolymers are required to withstand prolonged aging at elevated temperatures such as 75° to 100° C. or in which they are subjected to unusual oxidation conditions, it is desirable to incorporate into the film or molded product a small amount of an antioxidant. The latter protects the film or molded product from the deleterious effects of oxidizing conditions, retards embrittlement due to oxidation, and prolongs the useful life of the product under unusual conditions. Under ordinary conditions, films and molded products from the interpolymers are stable and no inhibitor is required. As suitable oxidation inhibitors phenolic or amine substances such as hydroquinone, naphthylamine, or eugenol may be used, the amount needed being small and of the order of 0.1 per cent to 1 per cent of the weight of interpolymer.

Interpolymers of methyl methacrylate and butadiene, containing 8 to 12 per cent of butadiene, being soluble in the common organic solvents, are well adapted as film-forming materials. The films are colorless, strong, tough and flexible. Adhesion of the films laid down on wood, glass, or metal from their solutions in solvents is excellent and hence the unpigmented solutions are useful as clear lacquers, varnishes, or adhesives whereas the pigmented solutions are suitable for coating compositions such as paints or pigmented lacquers for wood, metal, paper, leather and the like. Unpigmented films or sheeting are also useful as transparent wrapping material, safety glass interlayers, or adhesives such as by lamination. Unpigmented solutions or emulsions of the interpolymers are suitable for impregnating or coating paper, textiles, fibers, wood or other porous or semiporous materials to contribute such properties as strength, toughness, flexibility and impermeability to water. The same interpolymers are admirably adapted for molding by heat and pressure, with flowing characteristics particularly well suited for injection molding. The molded articles are tough, strong, flexible and suitable for mechanical working such as punching or drilling. They are distinguished from previous plastic materials by a remarkable bending property which may be described as the ability to withstand considerable bending pressure without breaking if the bending pressure is applied slowly. The interpolymers are thus ideally suited for the preparation of molded articles subject to bending strains such, for example, as combs and for applying as insulating coatings to electrical equipment such as wiring which is subjected to bending stresses. In general they are satisfactory for replacing cellulose derivatives such as nitrocellulose, cellulose acetate, ethyl cellulose, etc., in the manufacture of pen holders, knife handles, umbrella handles, electrical insulating material, wrapping material, and the like.

When the butadiene content is increased to sixteen per cent of the methyl methacrylate-butadiene interpolymer, the films are more flexible, but softer and more pliable. The sixteen per cent interpolymer is thus particularly applicable for the impregnation or coating of cloth or paper, as an interlayer for the manufacture of safety glass, and as an adhesive.

The butadiene-butyl methacrylate interpolymers or 3-component systems from butadiene, methyl methacrylate and butyl methacrylate are softer and more pliable than butadiene-methyl methacrylate interpolymers and of particular value as interlayers for safety glass or as bonding agents for other materials where flexibility and pliability are desirable. A great many degrees of toughness, flexibility and pliability are possible from these 3-component systems depending upon the proportions of methyl methacrylate to butyl methacrylate as well as the amount of butadiene, with the result that films, impregnating solutions, and molded articles of widely differing properties are possible. Various of the interpolymers are useful, for example, for the coating or impregnation of cloth or paper, improving the wet strength of paper, as laminating agents, as waterproofing or softening agents for textiles, as adhesives, and as transparent sheeting for wrapping clothing, food products, confectionery, tobacco products, and the like.

As indicated in the preceding section, the more rigid products from methyl methacrylate and butadiene have a degree of toughness and flexibility not possessed by polymeric methyl methacrylate or other of the common plastic materials. Most unusual is the property of these rigid products to absorb bending stresses without breaking, at the same time regaining the original shape when the stress is removed. Most unusual and advantageous is the fact that the toughness, flexibility and slow bending properties of the interpolymers are inherent properties and not acquired through the addition of plasticizer as ordinarily practiced. In short, the interpolymers are self- or internally-plasticized with resulting toughness and flexibility, and the disadvantages of incompatibility, exudation, loss by volatilization, etc., which usually attend addition of plasticizer, are entirely avoided. Finally, the invention furnishes a means of providing plastic materials of widely varying properties from the same two or three starting materials, namely, butadiene, methyl methacrylate and butyl methacrylate, making possible "made-to-order" resins by merely varying the proportions of the ingredients.

Suitable changes may be made in the details of the process without departing from the spirit or scope of the present invention, the proper limits of which are defined in the appended claims.

We claim:

1. A synthetic resin characterized by solubility in organic solvents, toughness, moldability, and amenability to mechanical working, said resin being obtained by subjecting to polymerizing conditions a mixture, the polymerizable constituents of which consist of from more than 80 to 96 per cent of at least one material of the formula

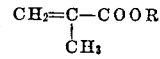

wherein R is an alkyl radical of low molecular weight, and from 4 to less than 20 per cent of at least one member of the group consisting of 1,3-butadiene, 2-methyl-1,3-butadiene, and 2,3-dimethyl-1,3-butadiene.

2. A synthetic resin characterized by solubility in organic solvents, toughness, moldability, and amenability to mechanical working, said resin being obtained by subjecting to polymerizing conditions a mixture, the polymerizable constituents of which consist of from more than 80 to 96 per cent of at least one material of the formula

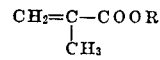

wherein R is an alkyl radical of from one to four carbon atoms and from 4 to less than 20 per cent of at least one member of the group consisting of 1,3-butadiene, 2-methyl-1,3-butadiene, and 2,3-dimethyl-1,3-butadiene.

3. A synthetic resin characterized by solubility in acetone, toughness, moldability, and amenability to mechanical working, said resin being obtained by subjecting to polymerizing conditions a mixture, the polymerizable constituents of which consist of from 92 to 84 per cent of at least one material of the formula

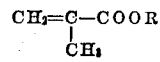

wherein R is an alkyl radical of from 1 to 4 carbon atoms and from 8 to 16 per cent of at least one member of the group consisting of 1,3-butadiene, 2-methyl-1,3-butadiene, and 2,3-dimethyl-1,3-butadiene.

4. A synthetic resin characterized by solubility in organic solvents, toughness, moldability, and amenability to mechanical working, said resin being obtained by subjecting to polymerizing conditions a mixture, the polymerizable constituents of which consist of from more than 80 to 96 per cent methyl methacrylate and from 4 to less than 20 per cent 1,3-butadiene.

5. A synthetic resin characterized by solubility in acetone, toughness, moldability, and amenability to mechanical working, said resin being obtained by subjecting to polymerizing conditions a mixture the polymerizable constituents of which consist of 92 to 84 per cent methyl methacrylate and of 8 to 16 per cent 1,3-butadiene.

6. A synthetic resin characterized by solubility in organic solvents, toughness, moldability, and amenability to mechanical working, said resin being obtained by subjecting to polymerizing conditions a mixture, the polymerizable constituents of which consist of from more than 80 to 96 per cent butyl methacrylate and from 4 to less than 20 per cent 1,3-butadiene.

7. A synthetic resin characterized by solubility in acetone, toughness, moldability, and amenability to mechanical working, said resin being obtained by subjecting to polymerizing conditions a mixture, the polymerizable constituents of which consist of 92 to 84 per cent butyl methacrylate and of 8 to 16 per cent 1,3-butadiene.

8. A synthetic resin characterized by solubility in organic solvents, toughness, moldability, and amenability to mechanical working, said resin being obtained by subjecting to polymerizing conditions a mixture, the polymerizable constituents of which consist of from more than 80 to 96 per cent of a mixture of methyl methacrylate and butyl methacrylate and from 4 to less than 20 per cent 1,3-butadiene.

9. A synthetic resin characterized by solubility in acetone, toughness, moldability, and amenability to mechanical working, said resin being obtained by subjecting to polymerizing conditions a mixture, the polymerizable constituents of which consist of 92 to 84 per cent of a mixture of methyl methacrylate and butyl methacrylate and of 8 to 16 per cent 1,3-butadiene.

10. A process of producing in granular form a synthetic resin characterized by solubility in organic solvents, toughness, moldability, and amenability to mechanical working, which process comprises dispersing in water and polymerizing a mixture the polymerizable constituents of which consist of from more than 80 to 96 per cent of at least one material of the formula $$CH_2=C-COOR$$
$$\phantom{CH_2=C-}|$$
$$\phantom{CH_2=C-}CH_3$$

wherein R is an alkyl radical of low molecular weight and from 4 to less than 20 per cent of at least one member of the group consisting of 1,3-butadiene, 2-methyl-1,3-butadiene, and 2,3-dimethyl-1,3-butadiene by means of a dispersing agent and stirring, the concentration of the dispersing agent being not substantially greater than an amount sufficient to maintain the esters in the dispersed phase while stirring is continued, and, to prevent coalescence of the dispersed particles during polymerization, the quantity of dispersing agent also being insufficient to give a permanently dispersed product.

11. A process of producing in granular form synthetic resin characterized by solubility in acetone, toughness, moldability, and amenability to mechanical working, which process comprises dispersing in water and polymerizing a mixture the polymerizable constituents of which consist of from 92 to 84 per cent of at least one material of the formula $$CH_2=C-COOR$$
$$\phantom{CH_2=C-}|$$
$$\phantom{CH_2=C-}CH_3$$

wherein R is an alkyl radical of from one to four carbon atoms and from 8 to 16 per cent of at least one member of the group consisting of 1,3-butadiene, 2-methyl-1,3-butadiene, and 2,3-dimethyl-1,3-butadiene by means of a dispersing agent and stirring, the concentration of the dispersing agent being not substantially greater than an amount sufficient to maintain the esters in the dispersed phase while stirring is continued, and, to prevent coalescence of the dispersed particles during polymerization, the quantity of dispersing agent also being insufficient to give a permanently dispersed product.

HAROLD WILFRED ARNOLD.
GEORGE LOWRANCE DOROUGH.

CERTIFICATE OF CORRECTION.

Patent No. 2,232,515. February 18, 1941.

HAROLD WILFRED ARNOLD, ET AL.

It is hereby certified that error appears in the printed specification of the above numbered patent requiring correction as follows: Page 2, first column, line 35, for "20 parts" read --60 parts--; and that the said Letters Patent should be read with this correction therein that the same may conform to the record of the case in the Patent Office.

Signed and sealed this 25th day of March, A. D. 1941.

(Seal)

Henry Van Arsdale,
Acting Commissioner of Patents.